Jan. 12, 1937.  C. PUTNAM  2,067,788
PNEUMATIC TIRE
Filed April 11, 1936
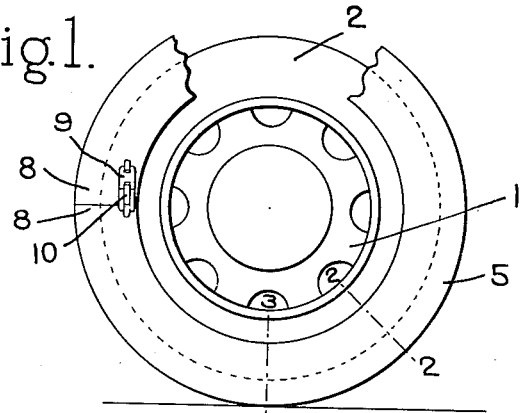
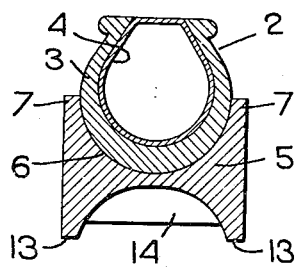
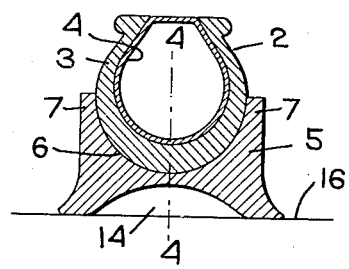
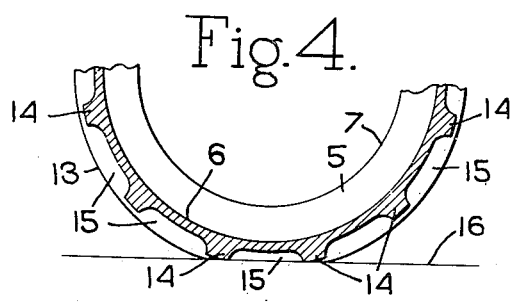
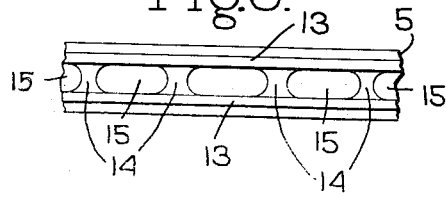
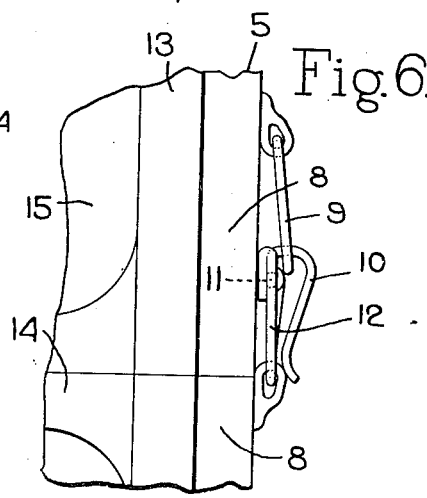
Inventor.
Carl Putnam
by Heard Smith & Tennant
Attys Patented Jan. 12, 1937

2,067,788

UNITED STATES PATENT OFFICE 2,067,788

PNEUMATIC TIRE

Carl Putnam, Norristown, Pa.

Application April 11, 1936, Serial No. 73,866

1 Claim. (Cl. 152—16)

This invention relates to pneumatic tires, and it has for one of its objects to provide a tire with an improved tread portion which has superior non-skid and road-gripping qualities.

In accordance with my invention the shoe portion of the tire is formed on its tread surface with two parallel non-rigid circumferential ribs situated at the shoulder regions of the tread surface, said ribs being sufficiently flexible and yielding so that they yield internally and bend outwardly when supporting a load, thereby materially increasing the width and extent of the road-engaging surface of the tire, said ribs being connected at spaced intervals by extensible bridge portions which combine with the ribs to form suction pockets providing a continuous grip on the roadbed.

In the drawing wherein I have illustrated a selected embodiment of the invention, Fig. 1 is a side view of an automobile wheel equipped with a tire embodying my invention.

Fig. 2 is a section through the tire on the line 2—2, Fig. 1.

Fig. 3 is a section through the tire on the line 3—3, Fig. 1.

Fig. 4 is a section through the detachable shoe on the line 4—4, Fig. 3.

Fig. 5 is an edge view of the portion of the shoe.

Fig. 6 is a fragmentary detail view showing a type of fastening device for clamping the shoe in a position which may be used.

My improvements may be embodied either in the tread surface of a tire casing or in a separate shoe portion adapted to be detachably secured to the tread surface of an automobile tire, and it is the latter construction which is illustrated herein. In Fig. 1, 1 indicates an automobile wheel and 2 the pneumatic tire thereof, said tire having the usual tire casing 3 and inner tube 4. 5 indicates a separable shoe member adapted to be detachably secured to the tread surface of the tire casing 3. This shoe member 5 is shown as having on its inner face a concave seat portion 6 in which the tread surface of the tire casing 2 is received, said shoe member having the side wings 7 that partially embrace the tire casing 2.

This shoe member may be made as a split ring which can be spread sufficiently to place it around the tire casing 2, and the end portions 8 of the shoe member 5 may be detachably fastened together by means of any suitable fastening devices. A simple fastening device is shown in Fig. 6 which consists of a loop member 9 secured to one end portion 8 of the shoe member 5 and a hook member 10 pivoted at 11 to a plate 12 that is secured to the other end 8 of the shoe member 5. This fastening device is of the common self-locking type which is frequently used for securing two edges together. To release the fastening device the hook member 10 is swung about its pivot 11 away from the plate 12 and may then be withdrawn from the loop in the member 9. In fastening the two ends 8 together the hook member 10 is inserted through the loop 9 and is then closed down against the plate 10, as shown in Fig. 6, the construction being such that the strain on the loop 9 will tend to hold the hook in its closed position.

The shoe member 5 is formed on its tread surface with two parallel peripheral ribs 13 situated at the shoulder regions of the shoe member. These ribs 13 are non-rigid and have sufficient flexibility so that when supporting a load they give or yield internally and bend outwardly, thus spreading apart as shown in Fig. 3. This spreading of the ribs by the internal yielding increases materially not only the width but also the length in the direction of motion of the road-engaging surface of the tire. Since the spreading action of the ribs results from internal yielding or bending thereof, the stress set up in the material of the ribs formed by this bending action and which tends to restore the ribs to their normal position shown in Fig. 2 increases the gripping action on the road surface of the bent or distorted ribs, and since these ribs are continuous and extend clear around the tire this gripping action will be continuous, thus improving the non-skid quality of the tire.

Situated between the ribs are spaced bridge portions 14 which have a lesser radial dimension than the ribs so that the outer surfaces of the bridge portions 14 normally lie below the outer surface of the ribs as shown in Figs. 2 and 4. These bridge portions 14 are slightly extensible, and when the ribs 13 are spread apart by the load to which they are subjected as shown in Fig. 3, the bridge portions connecting the spread ribs are stretched or elongated somewhat as also indicated in Fig. 3.

The pockets or depressions 15 bounded by the bridge portions 14 and the ribs 13 function somewhat as suction pockets because the spreading of the ribs 13 and the compression of the bridges 14 on the portion of the tire in contact with the road surface reduces the volume of and forces the air out of the pockets 15, thereby creating something of a suction effect which augments the non-slipping character of the tread surface.

The advantage of having the invention embodied in a detachable shoe member is that it is possible to apply this shoe member to a worn tire which has a relatively smooth tread surface, thereby converting the tire into one having a superior non-skid tread surface.

As stated above, however, the feature of the ribs 13 and the suction pockets 15 may be embodied in a tire casing as well without departing from the invention.

I claim.

A pneumatic tire for vehicles having a shoe portion consisting on its tread surface of two parallel circumferential ribs situated at the shoulder regions of said tread surface, said ribs and said shoe being composed of homogeneously flexible and resilient rubber, said ribs being sufficiently flexible and yielding to permit them to bend outwardly when supporting a load to thereby increase the width of the road-engaging surface of the tire when supporting a load, the strains thus set up in the ribs tending to return them to their normal position, said ribs being connected at spaced intervals by extensible bridge portions, the outer surfaces of which are at a lesser radial distance from the center of the tire than the outer surface of the ribs and so relatively extending as to engage the road surface on said flexure of the ribs.

CARL PUTNAM.